Jan. 25, 1966  G. B. JOHNSON  3,230,802
CUT-OFF TOOL AND HOLDER THEREFOR
Original Filed May 20, 1960
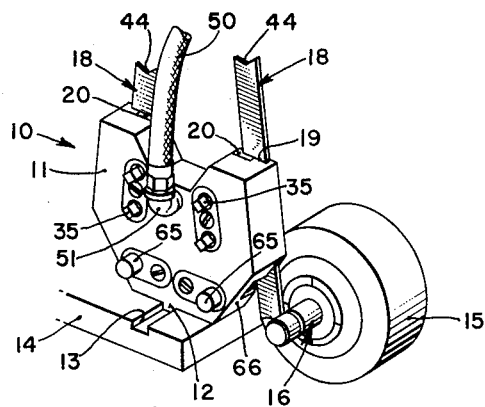
FIG. 1.
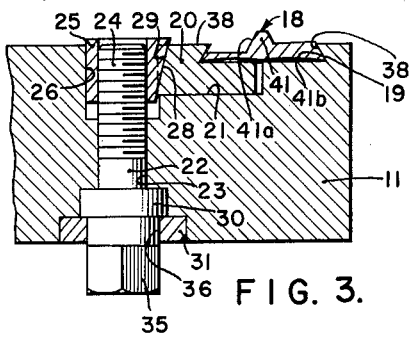
FIG. 3.
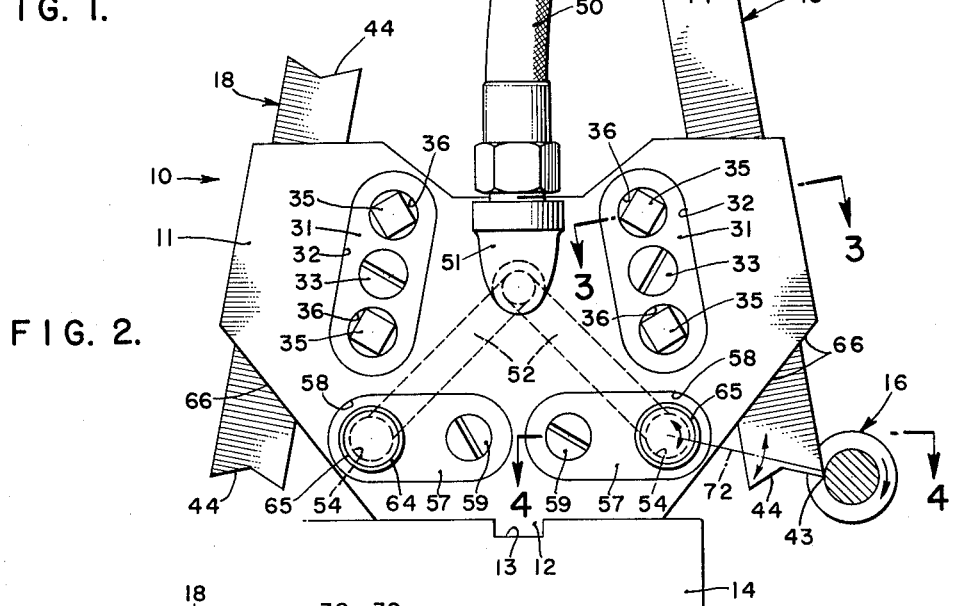
FIG. 2.
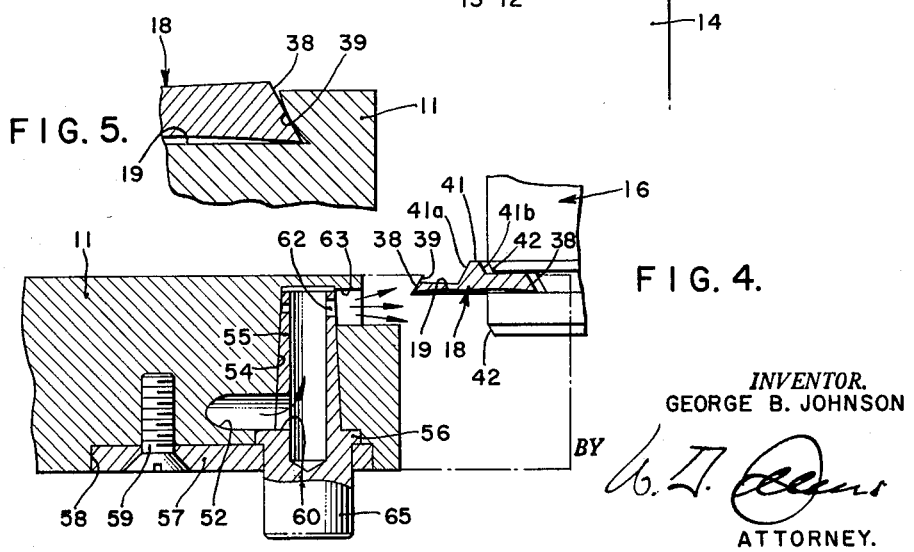
FIG. 5.
FIG. 4.
INVENTOR.
GEORGE B. JOHNSON
ATTORNEY.

United States Patent Office 3,230,802
Patented Jan. 25, 1966

3,230,802
CUT-OFF TOOL AND HOLDER THEREFOR
George B. Johnson, 2800 Newell St., Los Angeles, Calif.
Continuation of application Ser. No. 30,485, May 20, 1960. This application Sept. 14, 1964, Ser. No. 398,148
24 Claims. (Cl. 82—36)

This invention relates to tool holders and more particularly to a tool holder specially designed for rigidly supporting a plurality of cut-off tools selectively usable for making cut-offs of finished material from a rotating workpiece chucked in a machine tool.

The holder of this invention is particularly suitable for clamping a combination type cut-off tool of the design disclosed and claimed per se in my United States Letters Patent 2,979,805, granted April 18, 1961, entitled Cut-Off Tool. This application is a continuation of my application for United States Letters Patent SN 30,485, filed May 20, 1960, and now abandoned, for Cut-Off Tool and Holder Therefor.

Provisions for cutting off finished material from a workpiece chucked in a machine tool have been subject to various shortcomings and defects eliminated in a most satisfactory manner by the present invention. For example, the cut-off tool commonly employed in separating a finished piece from the main workpiece comprises a circular disc having a generally radially disposed notch the outer tip edge of which serves as the cutting edge. Such a disc must be clamped to the tool holder by means of a clamping bolt passing through a central opening through the disc. In order to reduce the tendency of the cutter to rotate about this clamping bolt and out of its proper operating position, it is desirable to keep the diameter of the cutter as small as possible. However, this small diameter minimizes the clamping area between the disc and the tool holder. Additionally, a different size cut-off disc is required for each change in the diameter of the workpiece being cut off. Still another disadvantage resides in the fact that such discs have no provision for chamfering the rim edge of the workpiece. Furthermore, only a single cut-off disc can be clamped in the tool holder at any given time with the result that the operator must make a complete new setup each time the tool in use requires reconditioning or each time there is need for using a different size cut-off tool.

Elongated cut-off tools have been proposed but these, likewise, are subject to disadvantages because they have only a relatively short cut-off portion supported at one end of a much thicker, rigid supporting body adapted to be clamped in the tool holder. The specially formed cutting end of the tool can be resharpened to increase the service life of the tool. However, resharpening necessitates grinding down the relatively thick main body of the tool at considerable cost in time and effort. Moreover, if attempts are made to prolong the life of the tool by grinding away the thick body portion in the manner just mentioned, care must be exercised to make provision for clearance rearward of the cutting edge. When ground to provide such clearance, it will be obvious that repeated grinding during sharpening operations soon reduces the thickness of the cutting end to such a point so as to destroy the strength of the cutting tool with the result that the cutting end is subject to breakage during use thereby jeopardizing the machine tool as well as the workpiece undergoing cutting.

By the present invention there is provided a cut-off tool and a specially designed holder therefor entirely avoiding the foregoing and other disadvantages of prior constructions. Both the cut-off tool and its holder are specially designed and mutually cooperate with one another to provide advantages not obtainable heretofore. The tool itself comprises an elongated, specially shaped bar of tool steel, tungsten carbide or other suitable material which is of uniform cross-section from end to end. A reinforcing rib extending centrally of the tool is specially contoured and disposed relative to the opposite lateral edges not only to reinforce and strengthen the rib but to provide a cutting edge useful in chamfering the rim edge of the stock being cut during the last stages of the cut-off operation. Of importance is the fact that the cutting edges of this rib are spaced different distances from an adjacent lateral edge of the tool whereby a given cut-off tool is adapted to cut off stock of two different diameters depending on which lateral edge is supported to engage the workpiece.

The tool holder proper embodies numerous features including a plurality of seating recesses and associated clamping members each adapted to seat and clutch a separate cut-off tool irrespective of which end of the tool is to be employed for cutting purposes. Accordingly, a given holder rigidly supports a plurality of cutters at any given time any one of which can be brought quickly and accurately into cutting position by shifting the holder about its axis much as the cutting tools of a turret head are adapted to be indexed successively into operating position.

The tool holder further features built-in means for directing a coolant and cutting agent onto the cutting edge of the tool in readily adjustable quantities to meet the needs of varying operating requirements. Still another feature concerns novel clamping means for clamping the cutting tools rigidly in position in close proximity to the workpiece without hazard to the cutting edges of the tool.

Accordingly, it is a primary object of the present invention to provide an improved cut-off tool and holder therefor adapted to be quickly attached to and detached from machine tools.

Another object of the invention is the provision of a tool holder designed to detachably clamp in place thereon a plurality of elongated double-ended blade-type cut-off tools and quickly adjustable to bring one of the several cutting edges of any tool quickly into cut-off position.

Another object of the invention is the provision of a cut-off tool holder incorporating built-in adjustable coolant fluid distributing means including a self-contained control for regulating the coolant.

Another object of the invention is the provision of an improved tool-holder having provision for detachably clamping therein a plurality of double-ended cutting tools adapted to be resharpened repeatedly from either end until substantially entirely consumed in use and wherein their accurately formed cutting edges are protected from possibility of damage from clamping action of the tool holder.

Another object of the invention is the provision of a tool holder embodying therein means for adjusting the rate and direction of flow of the cutting oil and including means for substantially concealing the adjusting and flow directing means within the confines of the body of the tool holder.

Another object of the invention is the provision of a tool holder having contoured tool engaging surfaces so disposed as to grip the tool along critical surfaces without hazard to these surfaces.

These and other more specific objects will appear upon reading the following specification and claims and upon considering in connection therewith the attached drawing to which they relate.

Referring now to the drawing in which a preferred embodiment of the invention is illustrated.

FIGURE 1 is a fragmentary perspective view of portions of a machine tool having mounted on a cross-slide carriage thereof a tool holder according to the present invention;

FIGURE 2 is a side elevational view on an enlarged scale of the holder shown in FIGURE 1;

FIGURE 3 is a fragmentary cross-sectional view on an enlarged scale of the tool clamping means taken along line 3—3 on FIGURE 2;

FIGURE 4 is a view similar to FIGURE 3 taken along line 4—4 on FIGURE 2; and

FIGURE 5 is a blow-up of the upper right hand corner of FIGURE 3 showing details of the clamping groove.

Referring more particularly to FIGURES 1 and 2, there is shown a preferred embodiment of the invention wherein the tool holder designated generally 10 is seen to comprise a rather massive single piece of steel. Holder 10 is provided with a transverse rib 12 across its lower end adapted to seat snugly within a complementally shaped groove 13 formed crosswise of a cross-slide carriage 14. It will be understood that cross-slide carriage 14 is of the usual type and usually mounted in pairs on the opposite sides of a machine tool, such as a lathe, and including suitable means for feeding the carriage laterally toward and away from a workpiece clamped in the chucking device 15 of a machine tool.

It is pointed out that tool holder body 11 is rigidly clamped in groove 13 in any suitable manner as by a cap screw 13' extending vertically through an elongated slot formed in carriage 14 and having its threaded end seated in a threaded well not shown but extending upwardly through the lower edge of body 11. Commonly such slots open through the bottom of groove 13 and open into a threaded well extending upwardly through rib 12 of the holder body. Various other expedients well known by those skilled in this art may be employed to detachably clamp tool holder 10 to carriage 14.

Each tool holder 10 is provided with a plurality of cut-off tool clamping grooves for seating and rigidly clamping in each a cut-off tool such as the elongated double-ended blade-like tools 18, 18. Blades 18 preferably are of uniform cross-section throughout their length and having the general contour best shown in FIGURE 3. The oppositely inclined or beveled lateral edges of the blades are clamped within and between the transversely crowned side walls of receiving grooves 19 formed along the face of tool holder body 11 adjacent the opposite lateral edges thereof. Receiving grooves 19 are formed in part by body 11 and in part by a movable clamping member or jaw 20 extending substantially the full length of groove 19 and having the cross-section best shown in FIGURE 3. Each clamping jaw 20 is bodily shiftable transversely of the width of groove 19 toward and away from the associated blade 18 within the elongated recess 21 of the holder body and is under the control of clamping screws 22 seated loosely within a transverse bore 23 through body 11. The threaded end 24 of this clamping screw mates with a threaded opening of a non-circular clamp actuating member 25 reciprocal axially of a well 26 formed in member 11. The right hand edge of actuating member 25 has an inclined surface 28 mating with a similarly inclined recess 29 formed cross-wise of the left hand edge of clamping member 20.

Clamping screw 22 is provided with an annular flange 30 positioned to underlie a retainer plate 31 seating within a receiving recess 32 formed in the face of body 11 and is held in place therein by a screw 33. Retaining plate 31 has openings 36 through which the non-circular head 35 of the clamping screws 22 project. Desirably, there are a pair of clamping screws 22 and associated actuating members 25 for each of the clamping jaws 20.

From the foregoing it will be apparent that the rotation of clamping screws 22 results in the movement of actuating member 25 axially along the screw in a direction dependent on the direction of rotation of the screw. No axial movement of the clamping screw takes place because of the cooperating action of flange 30 and the retainer 31. Furthermore, it will be appreciated that clamping member 20 is held lightly and detachably in assembled position within seating recess 21 because of the inclination and relationship of the cooperating cam surfaces 28 and 29 relative to one another.

An important feature of the clamping structure for cut-off blades 18 will now be described with particular reference to FIGURES 3 and 5. Attention is first called to the fact that the opposite lateral edges or side walls of clamping groove 19 flare outward and toward one another in the manner best shown in FIGURE 3, this flare conforming in general with the similarly disposed beveled lateral edges 38, 38 of cut-off blades 18. Inasmuch as the beveled edges 38, 38 are accurately machined and are to provide the actual cutting edges of blades 18 at sometime during the life of these blades, it is important that clamping means employed to hold these blades in place in the holder be designed to avoid the possibility of deforming or damaging these surfaces. The manner in which this is assured is best shown in FIGURE 5 from which it will be observed that the side wall portions of groove 19 and of clamping member 20 are transversely crowned as is indicated at 39 with the result that the crowned center portion of these walls contact beveled surface 38 intermediate the opposite wide flat surfaces of the cut-off blade. This design assures that no clamping pressure is applied to the actual cutting corners of the blade although it will be recognized that the inner longitudinal face edge of the blade is pressed rather snugly against the bottom wall of the seating groove 19 by the tightening of clamping screws 22.

Referring more particularly to FIGURES 3, 4 and 5, it is pointed out that cut-off blades 18 are of uniform cross-section throughout their length and feature a reinforcing rib 41 extending lengthwise of one face. Rib 41 features oppositely inclined lateral edges 41a, 41b disposed at an angle suitable for chamfering the rim edge 42 of the workpiece 26. Chamfer 42 is formed as an incident to the final stage of cut-off operation and as the cutting edge 43 of the cut-off tool reaches the axial center of the workpiece. It is to be noted that the chamfered trimming surface 41b is closer to the adjacent lateral cutting edge 38 of the blade than is chamfer cutting edge 41a relative to its associated lateral edge 38. These different distances will be recognized as appropriate for cutting off workpieces of slightly different diameters. It is for this reason that the cut-off blades 18 are provided with oppositely directed V-shaped notches 44 at their ends to facilitate use of either end of the tool for cut-off operations. For example, if it is desired to cut off the end of a workpiece of slightly different diameter, the longer blade of FIGURE 2 is removed from its clamping groove and turned end-for-end to bring cutting point 43' into cutting position in lieu of cutting point 43.

The diagonally opposed cutting corners of a particular blade may be employed in this manner while clamped in the left hand seating groove of the holder. To use the alternate diagonally disposed corners in a similar manner, holder 10 is transferred to the cross-slide carriage not shown but understood as present on the opposite side of the lathe from the one shown in FIGURE 1. Accordingly, it will be appreciated that all four corners of the cutting blade can be employed for cut-off operations and reconditioned repeatedly to maintain the tool at maximum cutting efficiency at all times. Eventually, the entire blade will be consumed in use and in the repeated reconditioning and sharpening operations.

Another important feature of the holder will now be described with the aid of FIGURE 4 showing details of the regulatable means for directing coolant fluid onto the cutting edge. Coolant fluid or oil is supplied to the holder through a suitable flexible hose 50 terminating in an elbow 51 threaded into one face of holder 11. This elbow communicates with a pair of distributing passages 52 each opening into a tapered bore 54 seating a valve plug 55. This plug is provided with a flange 56 bearing against the undersurface of a spring leaf retainer 57 seated in a recess 58 of the holder and held assembled therein by an adjustable assembly screw 59. It is pointed out that screw 59 is preferably so adjusted that the free end of the retainer bears against flange 56 to hold the valve plug 55 frictionally seated in bore 54. This hollow plug has an inlet opening 60 communicating with supply passage 52 and a suitable number of circumferentially spaced discharge ports 62 at its opposite end of different flow capacities. Thus, when the plug is rotated to the position shown in FIGURE 4, the larger discharge passage is aligned with a much larger discharge port 63 opening through the edge of holder body 11 and toward the cutting edge of blade 18. Opening 63 is sufficiently large to permit the valve plug to be adjusted to different rotary positions as desired to direct the flow against the cutting surfaces without, however, appreciably affecting the flow rate. As is well known to machinists, the viscosities of cutting fluids varies widely depending upon the cutting speed, material being cut and other factors. The provision of different size ports 62 in adjustable plug 55 together with the much larger size of port 63 enables the user to adjust to these different fluids merely by properly adjusting plug 55. If a smaller flow rate is desired, plug 54 is rotated to bring a smaller one of ports 62 into alignment with discharge port 63. By rotating the plug 55 ninety degrees from the position shown, it will be clear that ports 62 are closed and no flow occurs. The adjustment of plug 55 is accomplished by the aid of a knurled end 65 which projects outwardly from retainer spring 57, it being understood this adjustment permits the operator to vary the path taken by the coolant stream without changing the rate of flow.

As is made clear by FIGURES 1 and 2, there is a separate plug and coolant flow control for each cutting blade 18. Port 63 will be understood as discharging across the bias cut opposite lower corners 66 of holder 11. Desirably, corners 66 are formed at an angle of approximately 45 degrees and permit the body of the holder proper to be brought into close proximity to the workpiece to the end that the cutting end of blade 18 may be rigidly supported as close as possible to its cutting end.

In operation, let it be assumed that a pair of blades 18 have been clamped in recesses 19, 19 in the manner described above and that holder 10 has been rigidly clamped in groove 13 of the cross-slide carriage 14. Under these conditions the tool cutting point 43 of the blade to be used is positioned horizontally directly opposite the center of workpiece 16 to be cut. Clamping chuck 15 and workpiece 16 are then rotated clockwise as the usual feeding mechanism (not shown) for carriage 14 is operated to advance cutting point 43 into contact with the perimeter of the workpiece and then forward into the workpiece. In this manner, carriage 14 is gradually advanced to cut off the workpiece at an appropriate distance from its end surface. By the time point 16 closely approaches the axis of the workpiece, chamfer cutting surface 41b of reinforcing rib 41 engages the rim corner of the main body of workpiece 16 to chamfer this rim edge, the chamfer being finished as the cutting point 43 finally cuts off an end portion of the workpiece.

During the actual cutting operation, suitable cutting oil is applied through hose 50, passage 52 and plug valve 54 onto the area being cut, the knurled end 65 of the valve being rotated if necessary to direct the axis of the cutting stream indicated at 72 in FIGURE 2 against cutting point 43 of the tool. As the cutting operation is terminated plug 54 may be rotated either clockwise or counterclockwise by about 90 degrees to terminate the flow of cutting fluid.

If it is desired to remove the cutting tool for sharpening or to rotate it end-for-end to bring the other diagonal corner 43' into cutting position, it is merely necessary to loosen the pair of clamping screws 24 allowing clamping member 20 to be retracted away from tool 18. The tool is then slid endwise from seating groove 19 while being rotated through 180 degrees and then reassembled in seating groove 19 in the reverse manner. Clamping screws 24 are then tightened to force actuating members 25 against the edge clamping member 20 to clamp the tool rigidly in place.

While the particular cut-off tool and holder therefor herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A cut-off tool holder adapted to be detachably anchored to the transverse carriage of a machine tool while cutting off a newly machined component, said holder having a rigid main body having a shallow tool seating groove in one face thereof and adapted to seat a long straight double-edged cut-off tool therein characterized by its uniform cross-section from end to end thereof, clamping jaw means movable transversely of the width of said groove and having a shoulder parallel to the side walls of said groove and inclined oppositely to the opposed side wall of said groove, said oppositely inclined jaw and groove side walls being transversely crowned and effective to contact the opposite lateral edges of said tool intermediate the adjacent corners of said edges to avoid risk of injury to said corners, and means for actuating said jaw to clamp a cut-off tool in any desired position lengthwise of said groove.

2. A cut-off tool holder as defined in claim 1 characterized in that said means for actuating said jaw includes screw means having a threaded actuating member mounted thereon, said actuating member having an edge acutely inclined to the axis of said screw means and engageable with the outer edge of said clamping jaw to force the latter against one lateral edge of a cut-off tool, and the loosening of said screw means effecting the forcible retraction of said activating member to release the cut-off tool and to hold said actuating member retracted until said screw means is again moved to clamp a cut-off tool.

3. A cut-off tool holder as defined in claim 1 characterized in that the lower forward corner of said holder is cut off at an inclination to the axis of the cut-off tool, said tool seating groove opening at its lower end through the cut-off corner of said holder, the active sharpened end of said cut-off tool being normally adjusted to lie closely spaced to the lower end of said tool seating groove for maximum support from said holder while being advanced against a rotating workpiece being cut off.

4. A cut-off tool holder as defined in claim 3 characterized in the provision of cutting fluid supply means mounted on the body of said holder, said fluid supply means including a manually adjustable fluid jetting means concealed within said tool holder and located close to the lower cutting end of said cut-off tool.

5. A cut-off tool holder as defined in claim 3 characterized in the provision of cutting fluid supply means movably supported by the body of said holder and substantially concealed within the body thereof, and means for adjusting the rate and direction of flow of cutting fluid discharging therefrom and toward the area of a workpiece undergoing cutting.

6. A cut-off tool holder comprising a rigid main body having means on the lower edge thereof adapted to seat in a mounting groove in the upper surface of a machine tool transverse carriage, said holder having a plurality of wide shallow grooves in the vertical face thereof which grooves are inclined toward one another at an acute angle and each including a clamping jaw adjacent one edge of said groove together with adjustable actuator means for moving said jaws crosswise of the width of said grooves to clamp a cut-off tool rigidly in the respective ones of said grooves, an edge of said jaws and the facing side wall of the associated groove converging toward one another from the bottoms thereof and being transversely crowned to engage the beveled lateral edges of a cut-off tool seated in said grooves in longitudinal areas spaced from the corners of said lateral edges.

7. A cut-off tool holder as defined in claim 6 characterized in that said adjustable actuator means for said tool clamping jaws includes an operating screw threaded into said actuator means and, means for rotatably supporting said screw in said holder body while holding the screw against axial movement.

8. A cut-off tool holder as defined in claim 6 characterized in the provision of cutting fluid supply passage means formed in said holder between said tool seating grooves, and separate adjustable means mounted in said tool holder for controlling the direction and rate of flow of a cutting fluid.

9. A tool holder having a main body adapted to be clamped to a machine tool, means on said body for clamping a cutting tool thereto, a coolant flow passage concealed within said holder body having a discharge port opposite the cutting end of cutting tool when clamped to said holder in a proper operating position by said tool clamping means, means movably supported in said flow passage adjacent said discharge port having a plurality of discharge ports therein each adapted to be brought individually into position opposite said discharge port and being of smaller area than said discharge port whereby the path of the discharging coolant may be adjusted while maintaining the rate of coolant flow constant.

10. A cut-off tool and holder assembly therefor adapted to be detachably anchored to the cross-slide carriage of a machine tool while cutting off the end of a workpiece clamped in the chucking assembly of the machine tool, said cut-off tool holder assembly having a one-piece high-strength thick main body having generally parallel side faces, said main body having a horizontally disposed base provided with a low-height transverse rib extending thereacross and adapted to have a snug fit in the tool mounting groove opening upwardly through the top of a machine tool cross-slide carriage and extending parallel to the axis of the machine tool chucking assembly, means for holding said main body rigidly but detachably anchored to the cross-slide carriage with said rib seated in the tool mounting groove thereof, one end of said main body having its lower corner cut away to permit the advance feed of said holder assembly into the zone occupied by the workpiece, an elongated relatively shallow wide tool-seating groove formed in one face of said main body inclined acutely to the vertical and opening through the upper edge of said main body and through said cut-away corner, a tool clamping member seated along the edge of said groove spaced inwardly from the adjacent end edge of said main body, actuating means for said clamping member including first threaded means mounted in a nonthreaded bore extending transversely through said main body, second threaded means mounted over said first threaded means having an inclined surface cooperable with a complementally inclined surface of said tool clamping means and effective when said first threaded means is rotated in one direction to shift said tool clamping means crosswise of said groove to anchor an elongated thin wide cut-off tool blade firmly seated in said groove by clamping action applied to its thin lateral edges, the lower foremost cutting corner of said tool blade being exposed within the cut-away lower corner of the main body of said tool holder, and substantially all of said tool blade including the lower foremost corner thereof being positioned above a horizontal plane coincident with the axis of the workpiece.

11. A cut-off tool and holder assembly therefor as defined in claim 10 characterized in the provision of means for holding said first threaded means assembled to said main body and substantially against movement axially of the threads thereof but free for rotary movement.

12. A cut-off tool and holder assembly therefor as defined in claim 10 characterized in the provision of a plurality of actuating means for said tool clamping member each including cooperating first and second threaded means having complementally shaped inclined surfaces.

13. A cut-off tool and holder assembly therefor as defined in claim 10 characterized in that said cut-off tool seating groove is deeper along its inner edge than along its outer edge, said clamping member being generally L-shape in cross section with one leg thereof seated loosely within the deeper portion of said groove and its shorter leg generally normal thereto, the edge of said tool seating groove and the adjacent edge of the shorter leg of said clamping member converging toward the face of said main body and each being crowned transversely of the depth of the tool seating groove to grip the edges of an elongated wide thin cut-off tool in an area between the faces of the tool.

14. A cut-off tool and holder assembly therefor as defined in claim 10 characterized in that said elongated cut-off tool clamped in said tool seat groove is provided with a rib extending along one face thereof and offset to one side of the longitudinal axis of said tool, the oppositely facing edges of said rib being shaped and disposed to chamfer the rim edge of the workpiece as a portion of the workpiece is in the final stages of being severed from the main body thereof.

15. A cut-off tool and holder assembly therefor comprising an elongated wide thin tool blade having a V-shaped notch in at least one end thereof with each side of the V-notch inclined to the adjacent lateral edge of said blade to define a suitable chip rake angle with respect to a horizontal plane through the axis of a workpiece to be severed by said tool while said blade is rigidly supported above said horizontal plane, said tool holder having an elongated main body adapted to be rigidly clamped in the cross slide of a machine tool, the lower forward corner of said main body being cut away to permit the main body to advance closer to the workpiece, said main body having a mounting groove for said tool blade opening through one lateral face thereof and extending at an acute angle to the vertical with one end of said groove opening through said cut away corner, adjustable clamping means for holding said tool blade rigidly clamped in said mounting groove by clamping pressure applied against the opposite narrow lateral edges of said tool blade and placing the blade under compression transversely of the wider dimension thereof, said V-notch in said blade being inverted and at the lower end of said blade with the foremost side of said V-notch inclined acutely to a horizontal plane through the axis of the workpiece.

16. A cut-off tool and holder assembly therefor as defined in claim 15 characterized in that the face of said tool blade remote from said main body includes a rib extending longitudinally for the full length thereof and intersecting the apex of said V-notch.

17. A cut-off tool and holder assembly therefor as defined in claim 16 characterized in that said rib has its lateral edges offset by different amounts from the longitudinal axis of the blade and each being effective to cooperate with the adjacent lateral lower edge corner of the blade to chamfer the rim edge of the workpiece as an incident to the final stages of a given cut-off operation.

18. A tool holder as defined in claim 9 characterized in that one lower corner of said main body is cut away transversely thereof, said main body having a tool blade seating groove opening into said cut-away corner thereby permitting the cutting end of a tool blade mounted in said clamping means to extend into the cut-away area at the lower corner of said main body, said coolant discharge ports opening into said cut-away corner in a position to direct a flow of coolant onto the exposed lower end of said tool blade while in its normal cutting position.

19. A tool holder as defined in claim 18 characterized in that both lower corners at the opposite lateral edges of said main body are cut away transversely of said main body, said main body having separate tool blade seating means formed in the side wall thereof each opening into a respective one of said cut-away corners and each provided with one of said blade clamping means whereby a tool blade clamped therein has its lower end extending into said cut-away corners, the coolant discharge ports in said main body opening through said body and into said cut-away corners in position to direct separate flows of coolant onto the exposed lower cutting ends of said tool blades, and separate regulating means mounted in said main body for regulating the flow through each of said discharge ports.

20. A tool holder as defined in claim 19 characterized in the provision of a common flexible supply hose for coolant attached to said main body and connected interiorly of the latter to each of said discharge ports.

21. A tool holder as defined in claim 19 characterized in that said tool blades are of uniform cross section from end to end thereof and provided with V-shaped notches in their opposite ends providing a sharp cut-off edge at each terminal end corner of said tool blade.

22. A tool holder as defined in claim 21 characterized in that said tool blade clamping means are shaped to engage the opposite lateral edges of said tool blades in areas extending longitudinally of the blade and between the lateral edge corners of said blades thereby to avoid risk of damage to said edge corners.

23. A tool holder as defined in claim 22 characterized in that each of said tool blades is reversible end for end in their respective blade clamping means whereby either cutting corner at either end of said blades may be supported in workpiece cut-off position.

24. A cut-off tool holder as defined in claim 1 characterized in that said tool seating groove has open ends extending through remote edges of said main body thereby to support one end of a cut-off tool exposed beyond the edge of said main body, and coolant supply means formed in said main body and including a coolant discharge port positioned to direct a stream of coolant onto said exposed end of a cut-off tool clamped in said tool seating groove.

References Cited by the Examiner

UNITED STATES PATENTS

| | | | |
|---|---|---|---|
| 2,335,570 | 11/1943 | Montgomery | 29—95 |
| 2,679,679 | 6/1954 | Metzler | 29—95 |
| 2,979,805 | 4/1961 | Johnson | 29—95 |

FOREIGN PATENTS 548,299  9/1956  Italy.

WILLIAM W. DYER, JR., *Primary Examiner.*